Sept. 23, 1958  J. C. MOGLE  2,853,335
FISHING TOOLS
Filed Nov. 24, 1953  2 Sheets-Sheet 2
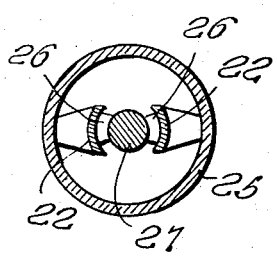
FIG_5
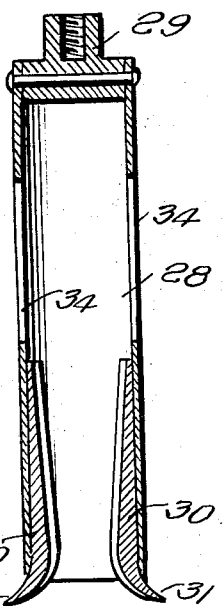
FIG_7
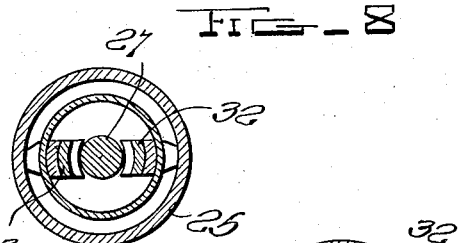
FIG_8
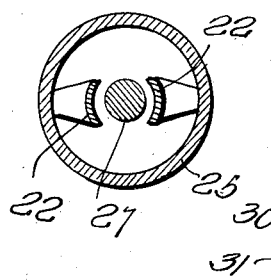
FIG_6
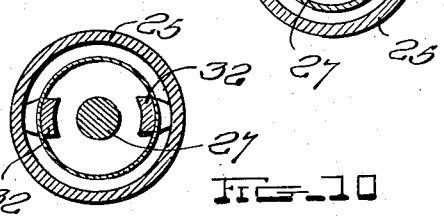
FIG_9  FIG_10
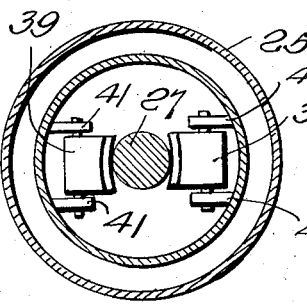
FIG_12
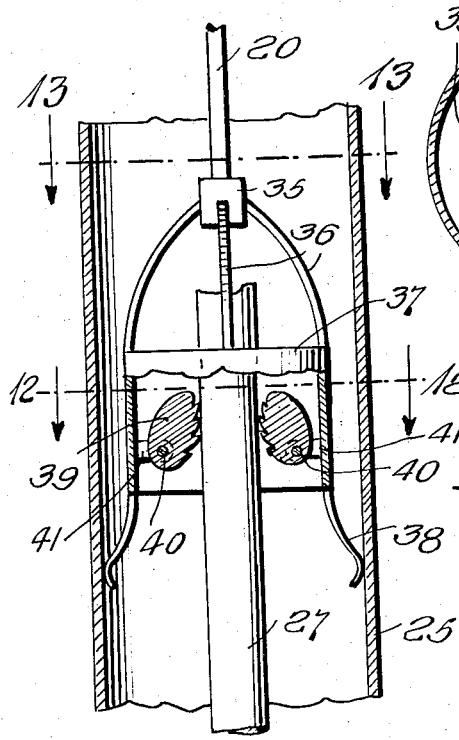
FIG_11  FIG_13
INVENTOR
JAMES MOGLE
BY Bennett S. Jones
ATTORNEY 2,853,335

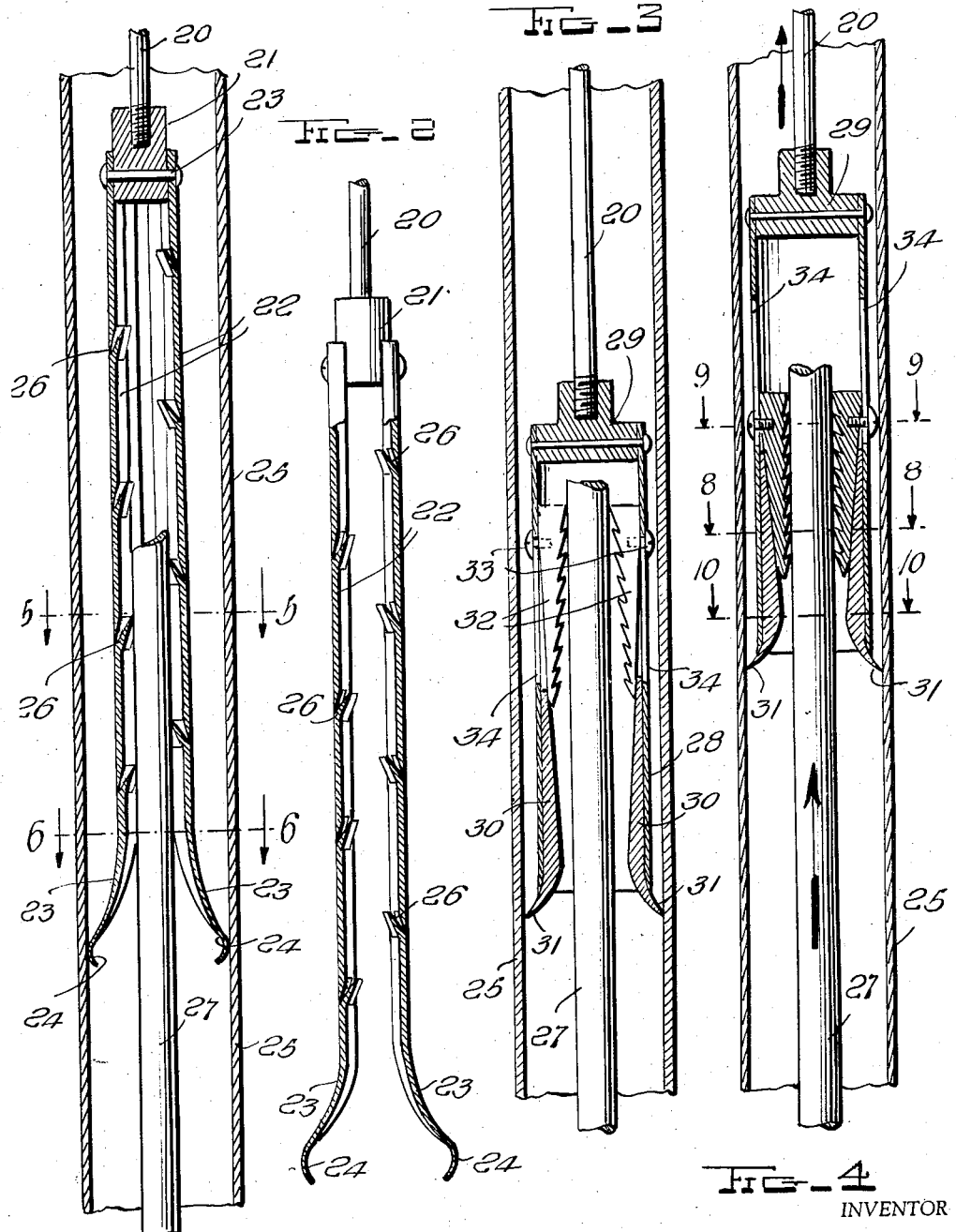

FISHING TOOLS

James C. Mogle, Cody, Nebr.

Application November 24, 1953, Serial No. 394,049

1 Claim. (Cl. 294—102)

The object of the invention is to provide a fishing tool and for the recovery of rods and pipes lost in a well or its equivalent, a tool having means for quick engagement with the pipe or rod so as to reduce to a minimum any manipulation necessary to effect the engagement; to provide a fishing tool provided with jaw members which will readily slide over the sought rod or pipe as it is lowered into the well and will automatically grip such rod or pipe when it, the tool, is retracted or raised; and generally to provide a device of this character which is of simple form, made up of few parts, sturdy and effective in operation, and cheap to manufacture and sell.

With this object in view, the invention consists in a construction and combination of parts of which preferred embodiments are illustrated in the accompanying drawings wherein:

Figure 1 is a vertically sectional view illustrating the use of one form of the invention;

Figure 2 is a vertically sectional view of that form of the invention illustrated in Figure 1;

Figure 3 is a view similar to Figure 1 but illustrating another form of the invention with the parts in the initial position of engaging a pipe or rod to be pulled;

Figure 4 is a sectional view of the structure of Figure 3 with the jaws in pipe or rod engaging position;

Figures 5 and 6 are sectional views on the planes indicated by the lines 5—5 and 6—6 of Figure 1;

Figure 7 is a vertically sectional view of the cam tube employed in that form of the invention illustrated in Figures 3 and 4;

Figures 8, 9 and 10 are sectional views on the planes indicated by the lines 8—8, 9—9 and 10—10 respectively of Figure 4;

Figure 11 is a sectional view similar to that of Figure 1 but illustrating still another form of the invention; and Figures 12 and 13 are sectional views on the planes indicated by the lines 12—12 and 13—13 of Figure 11.

In that form of the invention illustrated in Figures 1 and 2, the pull rod 20 is threadingly engaged with cylindrical head 21 on diametrical sides of which are mounted the arms 22, the rivet 23 passing diametrically through the head and being peened over on its ends against the arms. The latter depend from the head and are cross-sectionally arcuate, being substantially in parallelism throughout their extent by terminating in flared bearing fingers 23 formed with terminal noses 24 designed to bear against the inner periphery of the well casing 25 when the tool is inserted in the latter.

The arms 22 have inwardly projecting teeth 26 formed by striking them from the arms, the teeth on the two arms being arranged in respectively staggered relation. Thus, when the tool is lowered into a well for the purpose of withdrawing a lost rod, such as indicated at 27, the flared extremities 23 pass over the rod and the tool may be lowered until the upper extremity of the rod abuts or nearly abuts the head 21, the teeth having an inclination to permit them sliding over the rod in the lowering operation. After engaging with the rod, raising the tool causes the teeth to bite into the rod so that the latter is pulled or raised in the pulling operation.

In that form of the invention illustrated in Figures 3 and 4, a cam cylinder 28 is employed, being carried by a head 29 into which the pull rod 20 is threaded, the cam cylinder is open at the bottom and interiorly carries the cam slides 30 of which the lower extremities 31 are directed outwardly to bear against the inner periphery of the casing 25. Tooth jaws 32 are mounted on the interior of the cylinder and are slidingly secured to the latter through the instrumentality of fasteners 33 which traverse slots 34 in the cylinder.

Thus, in the pulling operation of this form of the invention, the tool is lowered into the well and the rod 27 enters the lower end of the cylinder, tending to raise the jaws to the highest point in the latter. When the head 29 abuts or nearly abuts the upper end of the rod, the withdrawing operation proceeds, when the tendency of the tool to be pulled away from the rod causes the jaws 32 to move down over the cam slides and thus into firm engagement with the rod, as clearly shown in Figure 4. Then the rod is firmly gripped and will be raised as the tool is withdrawn from the well.

In that form of the invention illustrated in Figure 11, the pull rod 20 is engaged, as in the other forms, with a head 35 from which the equally angularly spaced arms 36 depend, these being integrally formed with a cylinder 37 from the lower edge of which similarly spaced well cased bearing fingers 38 depend. Interiorly the cylinder carries the tooth jaws 39 which are of oval form and are mounted on pivot studs 40 rotated when mounted in spaced gears 41 formed on the interior of the cylinder.

In this form of the invention, when it is lowered into the well, the rod 27 passes between the jaws 40, causing them to swing away from each other, so that the tool may be lowered over the rod or pipe 27. When the pulling or lifting force is applied to the rod 20, the jaws tend to swing towards each other, causing the peripheral teeth thereof to bite into the pipe or tube, so that the latter follows the tool in the raising or lifting operation.

The invention having been described what is claimed as new and useful is:

In a fishing tool, the combination with a cylindrical well casing of uniform diameter throughout its length; of a hollow cylinder slidable longitudinally within said casing and of a diameter less than the internal diameter of said well casing, a head affixed to and closing the upper end of said cylinder, said cylinder having spaced longitudinal slots in its sides terminating inwardly from the top and bottom ends of said cylinder, cam members having their outer surfaces affixed to the inner surfaces of said cylinder in alignment with said slots and having one end terminating adjacent to one end of said slots, the opposite ends of said members protruding through the bottom open end of said cylinder and deflected outwardly to engage with the inner surface of said well casing, the thicknesses of said cam members gradually increasing toward the lower open end of said cylinder, an elongated jaw for each of said slots arranged longitudinally within said cylinder, a pin affixed to the upper end of each jaw and extending through its respective slot whereby said jaws may slide longitudinally within said cylinder, the lower ends of said jaws overlying the adjacent ends of their respective cam members, the thicknesses of said jaws increasing from the lower to the upper ends thereof, gripper teeth on the inner faces of said jaws, and a lift rod connected to said head.

References Cited in the file of this patent

UNITED STATES PATENTS

| | | | |
|---|---|---|---|
| 730,233 | Chickering | June 9, | 1903 |
| 1,486,624 | Bajus | Mar. 11, | 1924 |
| 1,612,041 | Morris | Dec. 28, | 1926 |
| 1,660,449 | Kinney | Feb. 28, | 1928 |
| 1,668,254 | Scott | May 1, | 1928 |
| 1,815,462 | Denney | July 21, | 1931 |
| 2,252,767 | Hudson | Aug. 19, | 1941 |
| 2,324,886 | Sowders | July 20, | 1943 |
| 2,567,337 | Hunt | Sept. 11, | 1951 |
| 2,718,427 | Price | Sept. 20, | 1955 |